United States Patent
Hayashi

(10) Patent No.: US 10,438,021 B2
(45) Date of Patent: Oct. 8, 2019

(54) DEVICE AND CONTROL METHOD

(71) Applicant: Yusuke Hayashi, Kanagawa (JP)

(72) Inventor: Yusuke Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 242 days.

(21) Appl. No.: 15/434,537

(22) Filed: Feb. 16, 2017

(65) Prior Publication Data
US 2017/0243016 A1    Aug. 24, 2017

(30) Foreign Application Priority Data

Feb. 23, 2016   (JP) ................................ 2016-032438

(51) Int. Cl.
*G06F 21/62* (2013.01)
*G06F 3/12* (2006.01)
*G06F 8/61* (2018.01)

(52) U.S. Cl.
CPC ............ *G06F 21/629* (2013.01); *G06F 3/123* (2013.01); *G06F 8/61* (2013.01); *G06F 8/62* (2013.01)

(58) Field of Classification Search
CPC .......... G06F 21/10; G06F 21/50; G06F 21/52; G06F 21/62; G06F 21/629; G06F 8/61; G06F 8/62; G06F 3/123; G06F 3/1287; G06F 3/12; G06F 3/1203; H04L 63/145
See application file for complete search history.

(56) References Cited

U.S. PATENT DOCUMENTS

| 9,787,574 B2 * | 10/2017 | Iwauchi | H04L 45/24 |
| 2010/0079793 A1 | 4/2010 | Nishikawa | |
| 2014/0355049 A1 * | 12/2014 | Hadano | G06F 3/123 |
| | | | 358/1.15 |
| 2015/0281501 A1 * | 10/2015 | Araki | H04N 1/00938 |
| | | | 358/1.13 |
| 2016/0092190 A1 * | 3/2016 | Chen | G06F 8/61 |
| | | | 717/177 |
| 2016/0234396 A1 * | 8/2016 | Yasukawa | B41J 29/38 |

FOREIGN PATENT DOCUMENTS

| JP | 2008-305047 | 12/2008 |
| JP | 2010-086069 | 4/2010 |

* cited by examiner

*Primary Examiner* — Khalil Naghdali
*Assistant Examiner* — Shaqueal D Wade
(74) *Attorney, Agent, or Firm* — Harness, Dickey & Pierce, P.L.C.

(57) ABSTRACT

A device includes: a main body unit; and an operating unit configured to control operations of the main body unit, the operating unit including an acquirer configured to acquire first model information about a model of the device from the main body unit, a model information manager configured to manage the acquired first model information in a manner that maintains integrity thereof, a software information manager configured to manage software information that indicates a model for which software installed on the device is intended, a determiner configured to determine, prior to startup of the software, whether or not the software is intended for the model of the device based on the first model information and the software information, and a controller configured to perform a control operation that inhibits utilization of a function related to the software when the software is not intended for the model of the device.

19 Claims, 8 Drawing Sheets

FIG.4

| DEVICE CATEGORY INFORMATION | DEVICE VERSION INFORMATION |
|---|---|
| OFFICE MODEL | 1st |

FIG.5

| DEVICE CATEGORY INFORMATION | DEVICE DESTINATION INFORMATION | DEVICE VERSION INFORMATION |
|---|---|---|
| OFFICE MODEL | COMMON | 1st |

FIG.6

| SOFTWARE CATEGORY INFORMATION | SOFTWARE DESTINATION INFORMATION | SOFTWARE VERSION INFORMATION |
|---|---|---|
| OFFICE MODEL | CHINA/TAIWAN | 1st |

FIG.7

UNUSABLE FIRMWARE IS INSTALLED

PROPER FIRMWARE:

MODEL CATEGORY: OFFICE,
      DESTINATION: COMMON, VERSION: 1st

INSTALLED FIRMWARE:

MODEL CATEGORY: OFFICE,
      DESTINATION: CHINA/TAIWAN, VERSION: 1st

DEVICE AND CONTROL METHOD

CROSS-REFERENCE TO RELATED APPLICATIONS

The present application claims priority under 35 U.S.C. § 119 to Japanese Patent Application No. 2016-032438, filed Feb. 23, 2016. The contents of which are incorporated herein by reference in their entirety.

BACKGROUND OF THE INVENTION

1. Field of the Invention

The present invention relates generally to devices and control methods.

2. Description of the Related Art

In recent years, a technique that prevents software that is not intended for use on a device, e.g., an image forming apparatus, from undesirably becoming usable on the device by automatically inhibiting installation of such software on the device is known. Examples of the software include firmware and application programs.

Examples of such a technique include a technique that determines whether or not software to be installed on a device is intended for use on the device by using information held by the device and inhibits installation when the software is not intended for use on the device.

Another example technique is disclosed in Japanese Unexamined Patent Application Publication No. 2010-086069 (Patent Document 1). According to this technique, a server determines whether or not firmware is publicly available. When the firmware is not publicly available and is not applied to an image forming apparatus, an instruction that prevents application of the firmware is issued to the image forming apparatus.

However, in a certain operating mode of the device, a situation where software is undesirably installed without making the determination as to whether or not the software is intended for use on the device prior to the installation can occur. Accordingly, the above-described conventional technique cannot sufficiently prevent software that is not intended for use on a device from undesirably becoming usable on the device.

In recent years, a device separated into a main body unit and an operating unit such that the operating unit controls operations of the main body unit is developed. In such a device, the operating unit generally makes the determination as to whether or not software is intended for use on the device. However, the operating unit is not necessarily capable of making the determination because the operating unit does not necessarily hold information, based on which the determination is to be made.

Therefore, there is a need for a device and a control method sufficiently capable of, even when the device includes a main body unit and an operating unit that controls operations of the main body unit, preventing software that is not intended for use on the device from undesirably becoming usable on the device.

SUMMARY OF THE INVENTION

According to exemplary embodiments of the present invention, there is provided a device comprising: a main body unit; and an operating unit configured to control operations of the main body unit, the operating unit including an acquirer configured to acquire first model information about a model of the device from the main body unit, a model information manager configured to manage the acquired first model information in a manner that maintains integrity thereof, a software information manager configured to manage software information, the software information indicating a model for which software installed on the device is intended, a determiner configured to determine, prior to startup of the software, whether or not the software is intended for the model of the device based on the first model information and the software information, and a controller configured to perform a control operation that inhibits utilization of a function related to the software when the software is not intended for the model of the device.

Exemplary embodiments of the present invention also provide a control method to be performed by an operating unit of a device including a main body unit and the operating unit configured to control operations of the main body unit, the control method comprising: acquiring first model information about a model of the device from the main body unit; managing the acquired first model information in a manner that maintains integrity thereof; managing software information, the software information indicating a model for which software installed on the device is intended; determining, prior to startup of the software, whether or not the software is intended for the model of the device based on the first model information and the software information; and performing a control operation that inhibits utilization of a function related to the software when the software is not intended for the model of the device.

Exemplary embodiments of the present invention also provide a device comprising: a main body unit; and an operating unit configured to control operations of the main body unit, wherein the operating unit includes circuitry configured to acquire first model information about a model of the device from the main body unit; manage the acquired first model information in a manner that maintains integrity thereof; manage software information, the software information indicating a model for which software installed on the device is intended; determine, prior to startup of the software, whether or not the software is intended for the model of the device based on the first model information and the software information; and perform a control operation that inhibits utilization of a function related to the software when the software is not intended for the model of the device.

BRIEF DESCRIPTION OF THE DRAWINGS

FIG. 4 is a diagram illustrating an example of information stored in advance in a model information storage of the present embodiment;

FIG. 5 is a diagram illustrating an example of information stored in the model information storage after additional registration of the present embodiment is performed;

FIG. 6 is a diagram illustrating an example of information stored in a software information storage of the present embodiment;

FIG. 7 is a diagram illustrating an example of an error screen of the present embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
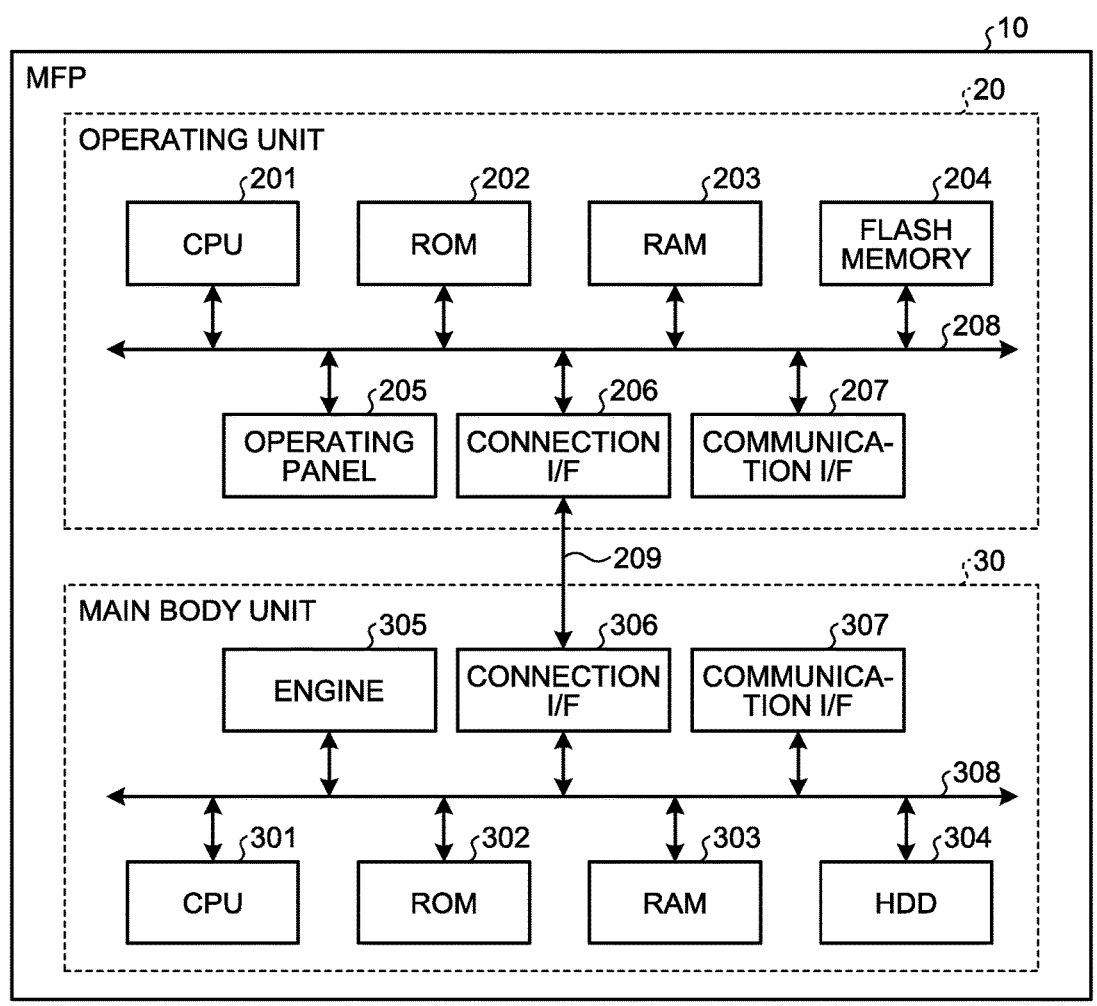
FIG. 1 is a schematic diagram illustrating an example of a hardware configuration of an MFP of an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention are described in detail below with reference to the accompanying drawings. Although the embodiments are described through examples where "device" is an MFP (Multifunction Peripheral), "device" is not limited thereto. The MFP is an apparatus having at least two functions of a printing function, a copying function, a scanner function, and a facsimile function. The device may be an image forming apparatus such as a printer, a copier, a scanner, and a facsimile, a variety of electronic equipment such as a projector, a camera, an air conditioner, a refrigerator, a fluorescent lamp, a vending machine, and a portable hand-held terminal, a PC (Personal Computer), or a smart device.

FIG. 1 is a schematic diagram illustrating an example of a hardware configuration of an MFP 10 of an embodiment. As illustrated in FIG. 1, the MFP 10 includes an operating unit 20 and a main body unit 30.

The main body unit 30 and the operating unit 20 are mutually communicably connected via a dedicated communication channel 209. A communication channel compliant with a USB (Universal Serial Bus) standard, for example, may be used as the communication channel 209. The communication channel 209 may be either wired or wireless. The communication channel 209 may be a network, such as the Internet, or a telephone channel.

Although FIG. 1 illustrates an example where the number of the operating units 20 connected to the main body unit 30 is one, the number of the operating units 20 is not limited thereto but can be any number. Similarly, although FIG. 1 illustrates an example where the number of the main body units 30 connected to the operating unit 20 is one, the number of the main body units 30 is not limited thereto but can be any number.

The main body unit 30 includes a CPU (Central Processing Unit) 301, a ROM (Read Only Memory) 302, a RAM (Random Access Memory) 303, an HDD (Hard Disk Drive) 304, an engine 305, a connection I/F 306, and a communication I/F 307. The CPU 301, the ROM 302, the RAM 303, the HDD 304, the engine 305, the connection I/F 306, and the communication I/F 307 are mutually connected via a system bus 308.

The engine 305 that performs various functions including a copier function, a scanner function, a facsimile function, and a printer function is hardware that executes general-purpose information processing and processing other than communication to implement these functions. The engine 305 includes, for example, a scanner that reads in an image of an original document, a plotter that performs printing on a sheet material such as paper, and a facsimile unit that performs facsimile communication. The engine 305 may further include a particular optional unit(s), such as a finisher that assorts sheets of a printed sheet material and an ADF (Automatic Document Feeder) that automatically feeds an original document(s).

The CPU 301 controls operations of the main body unit 30 in a centralized manner. The CPU 301 executes program instructions (hereinafter, "programs") stored in the ROM 302, the HDD 304, or the like by using the RAM 303 as a working area. By executing the programs, the CPU 301 controls operations of the main body unit 30 in a centralized manner. Specifically, the CPU 301 causes the engine 305 to perform the copier function, the scanner function, the facsimile function, the printer function, and the like described above.

The connection I/F 306 is an interface for performing communication with the operating unit 20 via the communication channel 209. The communication I/F 307 is an interface for performing communication with an external apparatus via a network.

The operating unit 20 is described below. The operating unit 20 accepts an input that depends on user operation. The operating unit 20 also displays various images (screens). The operating unit 20 has its own OS (Operating System) and its own screen transition mechanism. The main body unit 30 performs an operation that depends on the input accepted by the operating unit 20. In short, the operating unit 20 controls operations of the main body unit 30.

The operating unit 20 includes a CPU 201, a ROM 202, a RAM 203, a flash memory 204, an operating panel 205, a connection I/F 206, and a communication I/F 207. The CPU 201, the ROM 202, the RAM 203, the flash memory 204, the operating panel 205, the connection I/F 206, and the communication I/F 207 are mutually connected via a system bus 208.

The CPU 201 controls operations of the operating unit 20 in a centralized manner. The CPU 201 controls operations of the entire operating unit 20 by executing programs stored in the ROM 202, the flash memory 204, or the like by using the RAM 203 as a working area. By executing the programs, the CPU 201 implements various functions, which will be described later.

The connection I/F 206 is an interface for performing communication with the main body unit 30 via the communication channel 209. The communication I/F 207 is an interface for performing communication with an external apparatus via a network.

The operating panel 205 accepts various inputs, each depending on user operation, and displays various images (screens). Although the present embodiment is described through an example where the operating panel 205 is a touch panel that integrally includes an acceptance function that accepts the various inputs and a display function that displays the various images (screens), the operating panel 205 is not limited thereto. For example, the operating panel 205 may be made up of an input device that accepts the various inputs and a display device that displays a variety of information, in which the input device and the display device are separated from each other.

Figure 2:
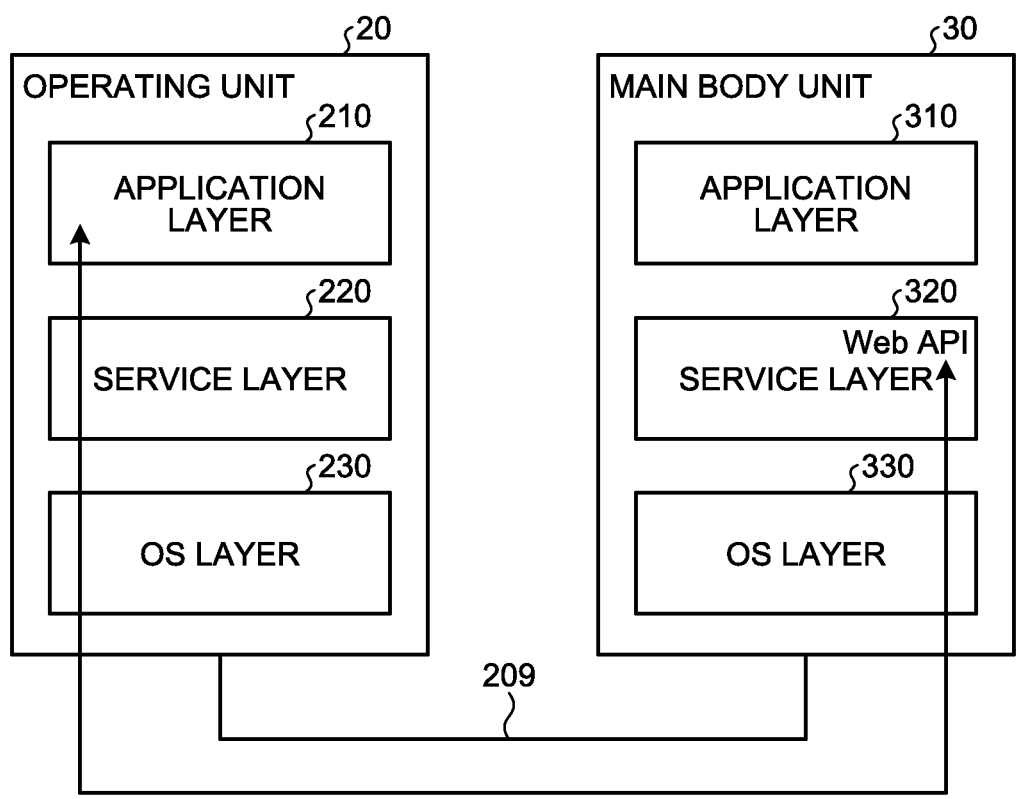
FIG. 2 is a schematic diagram illustrating an example of a software configuration of the MFP of the present embodiment.

A software configuration of the MFP 10 is described below. FIG. 2 is a schematic diagram illustrating an example of the software configuration of the MFP 10 of the present embodiment.

The main body unit 30 includes an application layer 310, a service layer 320, and an OS layer 330. The application layer 310, the service layer 320, and the OS layer 330 are implemented as various software stored in the ROM 302, the HDD 304, or the like. Various functions are provided by the CPU 301 by executing the software.

Software implementing the application layer 310 is an application program (hereinafter, sometimes simplified as "application") for providing predetermined functions by utilizing hardware resources. Examples of the application include a copier application for providing the copier function, a scanner application for providing the scanner function, a facsimile application for providing the facsimile function, and a printer application for providing the printer function.

Software implementing the service layer 320 is software for providing an interface, which is interposed between the application layer 310 and the OS layer 330, that enables applications to utilize hardware resources included in the main body unit 30. More specifically, the software provides a function of accepting operation requests, each requesting to utilize a hardware resource(s), and a function of arbitrating the operation requests. Examples of the operation requests to be accepted by the service layer 320 include a request requesting to perform reading using the scanner and a request requesting to perform printing using the plotter.

The service layer 320 provides the interface function not only to the application layer 310 of the main body unit 30 but also to an application layer 210 of the operating unit 20. For example, an interface function of a Web API (Application Program Interface) of the service layer 320 is provided by the Web API. Specifically, the application layer 210 (applications) of the operating unit 20 can implement functions that utilize the hardware resources (e.g., the engine 305) of the main body unit 30 via the interface function of the Web API of the service layer 320.

Software implementing the OS layer 330 is basic software (Operating System) for providing basic functions that control hardware included in the main body unit 30. Software implementing the service layer 320 converts a request, which is issued from an application of the various applications, requesting to utilize a hardware resource(s) into a command interpretable by the OS layer 330 and passes the command to the OS layer 330. Software implementing the OS layer 330 executes the command, thereby causing the hardware resource(s) to operate in accordance with the request of the application.

Similarly, the operating unit 20 includes the application layer 210, a service layer 220, and an OS layer 230. The application layer 210, the service layer 220, and the OS layer 230 included in the operating unit 20 have a hierarchal architecture similar to that of the main body unit 30. However, functions provided by applications of the application layer 210 and types of operation requests acceptable by the service layer 220 differ from those of the main body unit 30.

The applications of the application layer 210 may be software that provides predetermined functions by utilizing hardware resources included in the operating unit 20. The applications of the application layer 210 are software that mainly provides UI (User Interface) functions for performing operations and displays related to the functions provided by the main body unit 30. The functions provided by the main body unit 30 include, for example, the copier function, the scanner function, the facsimile function, and the printer function.

In the present embodiment, the software implementing the OS layer 330 of the main body unit 30 and the software implementing the OS layer 230 of the operating unit 20 differ from each other to maintain functional independence. Specifically, the main body unit 30 and the operating unit 20 operate on different operating systems independently of each other. For example, it is possible that Linux (registered trademark) is used as the software implementing the OS layer 330 of the main body unit 30, whereas Android (registered trademark) is used as the software implementing the OS layer 230 of the operating unit 20.

As described above, in the present embodiment, the main body unit 30 and the operation unit 20 operate on the different operating systems. Accordingly, communication between the main body unit 30 and the operating unit 20 is performed as communication between different devices rather than as inter-process communication in a same device. Examples of the communication between the main body unit 30 and the operating unit 20 include command communication and event notification. The command communication is a process that transmits information (an instruction given from a user) accepted by the operating unit 20 from the operating unit 20 to the main body unit 30. The event notification is a process that transmits a notification of an event from the main body unit 30 to the operating unit 20. In the present embodiment, the operating unit 20 can use the functions of the main body unit 30 by performing the command communication to the main body unit 30. Examples of the event, notification of which is transmitted from the main body unit 30 to the operating unit 20, include a current status of an operation performed in the main body unit 30 and settings configured in the main body unit 30.

The present embodiment is described through an example where power supply to the operating unit 20 is performed from the main body unit 30 via the communication channel 209. However, power supply control of the operating unit 20 is not limited thereto, and can be performed separately from (independently of) power supply control of the main body unit 30.

Figure 3:
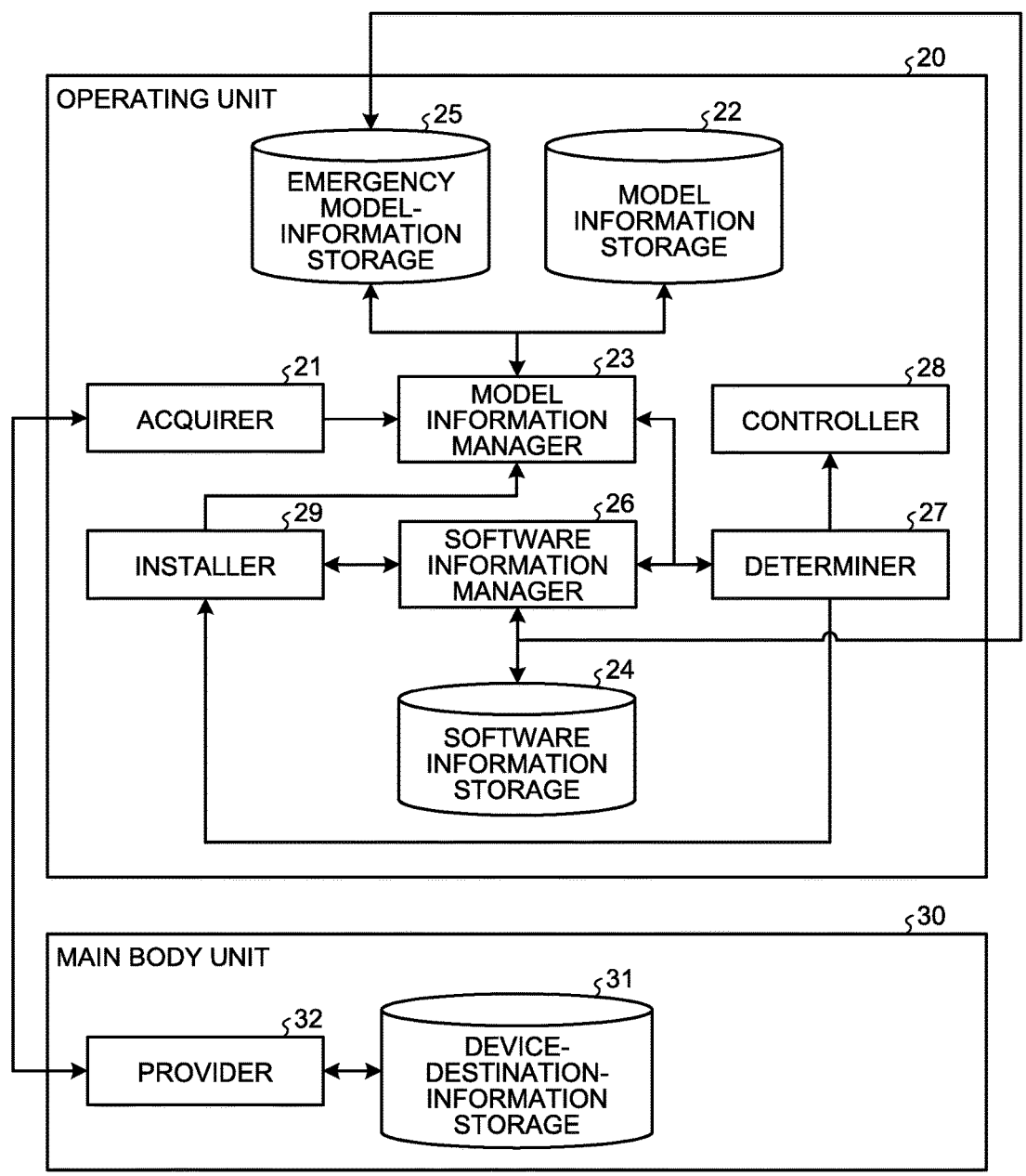
FIG. 3 is a block diagram illustrating an example of a functional configuration of an operating unit and a main body unit of the present embodiment.

A functional configuration of the MFP 10 is described below. FIG. 3 is a block diagram illustrating an example of a functional configuration of the operating unit 20 and the main body unit 30 of the present embodiment.

As illustrated in FIG. 3, the operating unit 20 includes an acquirer 21, a model information storage 22, a model information manager 23, a software information storage 24, an emergency model-information storage 25, a software information manager 26, a determiner 27, a controller 28, and an installer 29.

The acquirer 21 can be implemented by, for example, the CPU 201, the RAM 203, and the connection I/F 206. The model information storage 22, the software information storage 24, and the emergency model-information storage 25 can be implemented by, for example, the flash memory 204. The model information manager 23, the software information manager 26, the determiner 27, the controller 28, and the installer 29 can be implemented by, for example, the CPU 201 and the RAM 203.

As illustrated in FIG. 3, the main body unit 30 includes a device-destination-information storage 31 and a provider 32.

The device-destination-information storage 31 can be implemented by, for example, the ROM 302 and the HDD 304. The provider 32 can be implemented by, for example, the CPU 301, the RAM 303, and the connection I/F 306.

The acquirer 21 acquires first model information about a model of the MFP 10 from the main body unit 30. Specifically, when communication between the operating unit 20 and the main body unit 30 is first established, the acquirer 21 transmits a request command requesting for acquisition of the first model information to the main body unit 30, thereby acquiring the first model information about the MFP 10 from the main body unit 30. Examples of when communication between the operating unit 20 and the main body unit 30 is first established include when communication between the operating unit 20 and the main body unit 30 is established upon initial startup (power-on) of the MFP 10.

Although the present embodiment is described through an example where the first model information is device destination information indicating a destination of the model of the MFP 10, the first model information is not limited thereto. Although the present embodiment is described through an example where the device destination information about the MFP 10 is information indicating the destination of the model of the MFP 10, the device destination information is not limited thereto. Examples of the destination include, but are not limited to, "China/Taiwan" and destinations other than "China/Taiwan" (hereinafter, sometimes referred to as "common"). In the present embodiment, destinations are thus classified into "China/Taiwan" and "common". This is because there are fonts that are to be displayed only on "China/Taiwan" models but are not to be displayed on "common" models. Although the present embodiment is described through an example where the device destination information indicates "common", the device destination information is not limited thereto.

The device-destination-information storage 31 stores the device destination information about the MFP 10. In the present embodiment, as described above, it is assumed that the device destination information about the MFP 10 stored in the device-destination-information storage 31 indicates "common".

Upon receiving the request command requesting for acquisition of the first model information from the operating unit 20, the provider 32 acquires the device destination information about the MFP 10 from the device-destination-information storage 31 and provides the device destination information to the operating unit 20.

The model information storage 22 stores second model information about the model of the MFP 10 in advance. The second model information may be stored in the model information storage 22 when shipped from a factory, for example. Although the present embodiment is described through an example where the second model information is stored in the model information storage 22 in a form registered on a master file, the second model information is not limited thereto.

Although the present embodiment is described through an example where the second model information is device category information that indicates a category where the model of the MFP 10 belongs and device version information that indicates a version of the operating unit 20, the second model information is not limited thereto. Examples of the model category include, but are not limited to, office model, wide-format model, and production printing model. The version may be incremented such that, for example, an operating unit of the first separate-type model, in which the operating unit and a main body unit are separated, is set to the first version, which is updated to the second version and then to the third version each time the operating unit is renewed.

FIG. 4 is a diagram illustrating an example of information stored in advance in the model information storage 22 of the present embodiment. In the example illustrated in FIG. 4, the device category information about the MFP 10 and the device version information about the operating unit 20 (the MFP 10) are stored in the model information storage 22. In the example illustrated in FIG. 4, the device category information about the MFP 10 indicates "office model"; the device version information about the operating unit 20 indicates the first version.

The model information manager 23 manages the second model information about the MFP 10 in advance. Specifically, the model information manager 23 manages the second model information about the MFP 10 (the device category information about the MFP 10 and the device version information about the operating unit 20) on the model information storage 22 in advance.

When the first model information about the MFP 10 has been acquired by the acquirer 21, the model information manager 23 further manages the first model information. Specifically, the model information manager 23 additionally registers (stores) the first model information in the model information storage 22 to manage the first model information about the MFP 10. More specifically, the model information manager 23 performs additional registration of the first model information about the MFP 10 (the device destination information about the MFP 10) on the master file where the second model information about the MFP 10 (the device category information about the MFP 10 and the device version information about the operating unit 20) is registered, thereby managing the first model information and the second model information about the MFP 10 on the model information storage 22.

FIG. 5 is a diagram illustrating an example of information stored in the model information storage 22 after the additional registration of the present embodiment is performed. In the example illustrated in FIG. 5, the device category information about the MFP 10, the device destination information about the MFP 10, and the device version information about the operating unit 20 (the MFP 10) are stored in the model information storage 22. That is, the device destination information about the MFP 10 is registered so as to be added to the information illustrated in FIG. 4. In the example illustrated in FIG. 5, the device destination information about the MFP 10 indicates "common" as described earlier.

In the present embodiment, the model information storage 22 is implemented in an operating-unit information area, which is a part of the storage area of the flash memory 204 for storing information about the operating unit 20. In the present embodiment, access (read/write) to the operating-unit information area (the model information storage 22) is permitted only to the model information manager 23, but is not permitted to the other functional units (modules) including the software information manager 26, which will be described later. In the present embodiment, the model information manager 23 performs a write to the model information storage 22 only when additionally registering the first model information, and does not alter information stored in the model information storage 22 at the other occasions including when the operating unit 20 is initialized.

Hence, the model information manager 23 manages the first model information and the second model information without altering the first model information and the second model information on the model information storage 22, access to which is permitted only to the model information manager 23, thereby managing the first model information and the second model information in a manner that maintains integrity thereof. Accordingly, the present embodiment ensures integrity (i.e., ensures that the content of the first model information and the second model information is not altered) of the content of the first model information and the second model information (i.e., the content of the master file) stored in the model information storage 22 after the model information manager 23 has performed the additional registration of the first model information about the MFP 10.

The software information storage 24 stores software information that indicates a model for which software installed on the MFP 10 is intended. Hereinafter, an example where software installed on the MFP 10 is firmware installed on the MFP 10 is described. However, the software is not limited thereto, but can be an application or the like. The installation may be either a new installation or an update.

Although the present embodiment is described through an example where the software information is stored in the software information storage 24 in a form registered on a firmware type file, the software information is not limited thereto. Although the present embodiment is described through an example where the software information is software destination information indicating a destination of the installed firmware, software category information indicating a model category, for which the firmware is intended, and software version information indicating a version, for which the firmware is intended, the software information is not limited thereto.

The software destination information indicates the destination of the installed firmware. The software destination information indicates, for example, "China/Taiwan" or "common" as does the device destination information. The software category information indicates the model category, for which the installed firmware is intended. The software category information indicates, for example, office model, wide-format model, or production printing model as does the device category information. The software version information indicates a version of the operating unit 20, for which the installed firmware is intended. The software version information indicates the version of the operating unit 20 as does the device version information. The model category indicated by the software category information may be a plurality of categories. The version indicated by the software version information may be a plurality of versions or a version range (e.g., from the first version to the third version).

FIG. 6 is a diagram illustrating an example of information stored in the software information storage 24 of the present embodiment. In the example illustrated in FIG. 6, the software destination information, the software category information, and the software version information about the firmware installed on the MFP 10 are stored in the software information storage 24. In the example illustrated in FIG. 6, the software category information indicates "office model"; the software destination information indicates "China/Taiwan", and the software version information indicates the first version.

The emergency model-information storage 25 stores emergency model information that is provided in conjunction with installation of the software on the MFP 10. Although the present embodiment is described through an example where installation of software on the MFP 10 is installation of firmware on the MFP 10, the software is not limited thereto.

Although the present embodiment is described through an example where the emergency model information is emergency device category information, emergency device destination information, and emergency device version information, the emergency model information is not limited thereto. The emergency device category information, the emergency device destination information, and the emergency device version information are information similar to the device category information about the MFP 10, the device destination information about the MFP 10, and the device version information about the operating unit 20, respectively. Note that the category indicated by the emergency device category information, the destination indicated by the emergency device destination information, and the version indicated by the emergency device version information are set by a manufacturer of the firmware.

The software information manager 26 manages software information that indicates a model for which software installed (firmware installed) on the MFP 10 is intended. The software information (the software destination information, the software category information, and the software version information) is contained in installation information, which is information for installing firmware on the MFP 10. Accordingly, when the firmware is to be installed by the installer 29, which is described later, the software information manager 26 registers (stores) the software information in the software information storage 24, thereby managing the software information on the software information storage 24.

When the firmware is to be updated, the software information manager 26 updates (overwrites) the software information (i.e., the software information about the not-yet-updated firmware) stored in the software information storage 24 with software information contained in update installation information about the firmware, thereby managing the updated software information on the software information storage 24.

Similarly, the software information manager 26 manages the emergency model information that is provided in conjunction with installation of the software (installation of the firmware) on the MFP 10. The emergency model information (the emergency device category information, the emergency device destination information, and the emergency device version information) is a file contained in the installation information, which is the information for installing the firmware on the MFP 10. Accordingly, when the firmware is to be installed by the installer 29, which is described later, the software information manager 26 registers (stores) this file as a recovery master file in the emergency model-information storage 25, thereby managing the file on the emergency model-information storage 25.

When the firmware is to be updated, the software information manager 26 updates (overwrites) the recovery master file (the emergency model information that is not updated yet) stored in the emergency model-information storage 25 with the file contained in the update installation information about the firmware, thereby managing the updated recovery master file on the emergency model-information storage 25.

In the present embodiment, the software information storage 24 and the emergency model-information storage 25 are implemented in a firmware information area, which is a part of the storage area of the flash memory 204 for storing information about the firmware. The information about the firmware stored in the firmware information area (the software information storage 24 and the emergency model-information storage 25) is updated each time the firmware is updated or firmware is newly installed as described earlier.

The determiner 27 determines, prior to startup of software installed on the MFP 10, whether or not the software is intended for the model of the MFP 10 based on the first model information managed by the model information manager 23 and the software information managed by the software information manager 26.

In the present embodiment, the software installed on the MFP 10 is the firmware installed on the MFP 10 as described above; the firmware is started upon startup of the MFP 10. Accordingly, the determiner 27 makes the above-described determination at startup of the MFP 10. Note that when the software installed on the MFP 10 is an application, the determiner 27 may preferably make the above-described determination at startup of the application.

Specifically, the determiner 27 compares the device category information about the MFP 10, the device destination information about the MFP 10, and the device version information about the operating unit 20 managed by the model information manager 23 with the software destination information, the software category information, and the software version information managed by the software information manager 26, respectively.

When at least any one of a result that the device category information does not meet the software category information, a result that the device destination information does not meet the software destination information, and a result that the device version information does not meet the software version information is obtained, the determiner 27 determines that the installed firmware is not intended for the model of the MFP 10 (i.e., the firmware is not intended for use on the model of the MFP 10).

On the other hand, when the device category information meets the software category information, the device destination information meets the software destination information, and the device version information meets the software version information, the determiner 27 determines that the installed firmware is intended for the model of the MFP 10 (i.e., the firmware is intended for use on the model of the MFP 10).

In the present embodiment, the determiner 27 determines that the device category information meets the software category information when the category indicated by the device category information is contained in the category(ies) indicated by the software category information, but determines that the device category information does not meet the software category information when the category indicated by the device category information is not contained in the category(ies) indicated by the software category information. For example, when the device category information indicates "office model" but the software category information indicates "wide-format model", the determiner 27 determines that the device category information does not meet the software category information.

Similarly, the determiner 27 determines that the device destination information meets the software destination information when the destination indicated by the device destination information is contained in the destination indicated by the software destination information, but determines that the device destination information does not meet the software destination information when the destination indicated by the device destination information is not contained in the destination indicated by the software destination information. For example, when the device destination information indicates "common" but the software destination information indicates "China/Taiwan", the determiner 27 determines that the device destination information does not meet the software destination information.

Similarly, the determiner 27 determines that the device version information meets the software version information when the version indicated by the device version information is contained in the version(s) indicated by the software version information, but determines that the device version information does not meet the software version information when the version indicated by the device version information is not contained in the version(s) indicated by the software version information. For example, when the device version information indicates the second version but the software version information indicates the third version, the determiner 27 determines that the device version information does not meet the software version information. The determiner 27 may determine that the device version information meets the software version information also when the version indicated by the device version information is newer than the version indicated by the software version information (for example, when the device version information indicates the third version and the software version information indicates the second version).

Assume that the information illustrated in FIG. 5 is given as the device category information about the MFP 10, the device destination information about the MFP 10, and the device version information about the operating unit 20 managed by the model information manager 23 and that the information illustrated in FIG. 6 is given as the software destination information, the software category information, and the software version information managed by the software information manager 26.

In this case, the device destination information about the MFP 10 indicates "common" but the software destination information indicates "China/Taiwan". Accordingly, the determiner 27 determines that the device destination information does not meet the software destination information and, accordingly, determines that the installed firmware is not intended for the model of the MFP 10.

Suppose that should the following situation occur, in which the device category information about the MFP 10, the device destination information about the MFP 10, and the device version information about the operating unit 20 are not stored in the model information storage 22 and therefore the model information manager 23 is not managing the device category information about the MFP 10, the device destination information about the MFP 10, and the device version information about the operating unit 20.

In this situation, the model information manager 23 copies the recovery master file stored in the emergency model-information storage 25 to the model information storage 22 as a master file and uses the emergency device category information, the emergency device destination information, and the emergency device version information as the device category information about the MFP 10, the device destination information about the MFP 10, and the device version information about the operating unit 20, respectively.

Hence, even if a situation in which the model information manager 23 is not managing the device category information about the MFP 10, the device destination information about the MFP 10, and the device version information about the operating unit 20 should occur, the determiner 27 can make the above-described determination. Specifically, in this situation, the determiner 27 determines whether or not the software (the firmware) is intended for the model of the MFP 10 based on the emergency model information (the emergency device category information, the emergency device destination information, and the emergency device version information) and the software information (the software destination information, the software category information, and the software version information).

When the determiner 27 determines that the software installed on the MFP 10 is not intended for the model of the MFP 10, the controller 28 performs a control operation that inhibits utilization of a function(s) related to the software.

In the present embodiment, the software installed on the MFP 10 is the firmware installed on the MFP 10 as described above. Accordingly, the controller 28 performs the control operation that inhibits utilization of functions related to the firmware when the firmware is not intended for the model of the MFP 10. Specifically, the controller 28 aborts starting the firmware, and performs a control operation that causes a screen indicating that the firmware is not intended for the model of the MFP 10 to be displayed and a control operation that disables operations performed on the operating unit 20.

For example, the controller 28 may perform a control operation that causes such an error screen as that illustrated in FIG. 7 to be displayed as the screen indicating that the firmware is not intended for the model of the MFP 10. The error screen illustrated in FIG. 7 indicates, in addition to a notification that the firmware is not intended for (i.e., the firmware is unusable on) the model of the MFP 10, the category, the destination, and the version of the firmware intended for the model of the MFP 10 (i.e., proper firmware that is to be installed) and the category, the destination, and the version of the firmware currently installed on the MFP 10.

For example, the controller 28 may perform a control operation that causes every operation performed by a user on the operating panel 205 to be ignored as the control operation that disables operations performed on the operating unit 20. Because this control operation disables every operation performed on the operating unit 20, an attempt of using the firmware that is not intended for the model of the MFP 10 can be prevented.

Because it is assumed in the present embodiment that the firmware is involved in all the functions of the MFP 10, the control operation that disables every operation performed on the operating unit 20 is performed. However, when, for example, software that is determined as not being intended for the model of the MFP 10 is an application, a control operation that disables starting the application may preferably be performed.

When the determiner 27 determines that the software installed on the MFP 10 is intended for the model of the MFP 10, the controller 28 starts the firmware with normal mode.

The installer 29 installs to-be-installed software on the MFP 10. The location where the software is to be installed may be either the operating unit 20 or the main body unit 30. Although the present embodiment is on an assumption that software is installed in accordance with an operation and instruction of a customer engineer or the like, installation of the software is not limited thereto.

In the present embodiment, the to-be-installed firmware is installed on the MFP 10 as described above. Note that the installer 29 can install the firmware in either a first mode or a second mode in the present embodiment.

In the present embodiment, it is assumed that installation of the firmware in the first mode is performed such that a customer engineer causes the installer 29 to install the firmware using a tool, such as a PC (Personal Computer), in a normal mode.

Installation of the firmware in the first mode is performed as follows. The determiner 27 makes the above-described determination prior to installation of the firmware. When it is determined that the to-be-installed firmware is intended for the model of the MFP 10, the installer 29 installs the firmware on the MFP 10, whereas when it is determined that the to-be-installed firmware is not intended for the model of the MFP 10, the installer 29 aborts installation of the firmware.

In the present embodiment, it is assumed that installation of the firmware in the second mode is performed such that a customer engineer causes the installer 29 to install the firmware in a recovery mode. Note that, when the firmware is installed in the second mode, the determiner 27 does not make the above-described determination prior to installation of the firmware; the installer 29 unconditionally installs the to-be-installed firmware on the MFP 10.

For this reason, installation in the second mode can lead to a situation where firmware that is not intended for the model of the MFP 10 is unintentionally installed by human error made by a customer engineer and the firmware is undesirably used on the MFP 10.

To avoid occurrence of such a situation, in the present embodiment, as described above, when installed firmware is not intended for the model of the MFP 10, the controller 28 aborts starting the firmware and performs the control operation that causes such an error screen as that illustrated in FIG. 7 indicating that the firmware is not intended for the model of the MFP 10 to be displayed and the control operation that disables operations performed on the operating unit 20.

Figure 8:
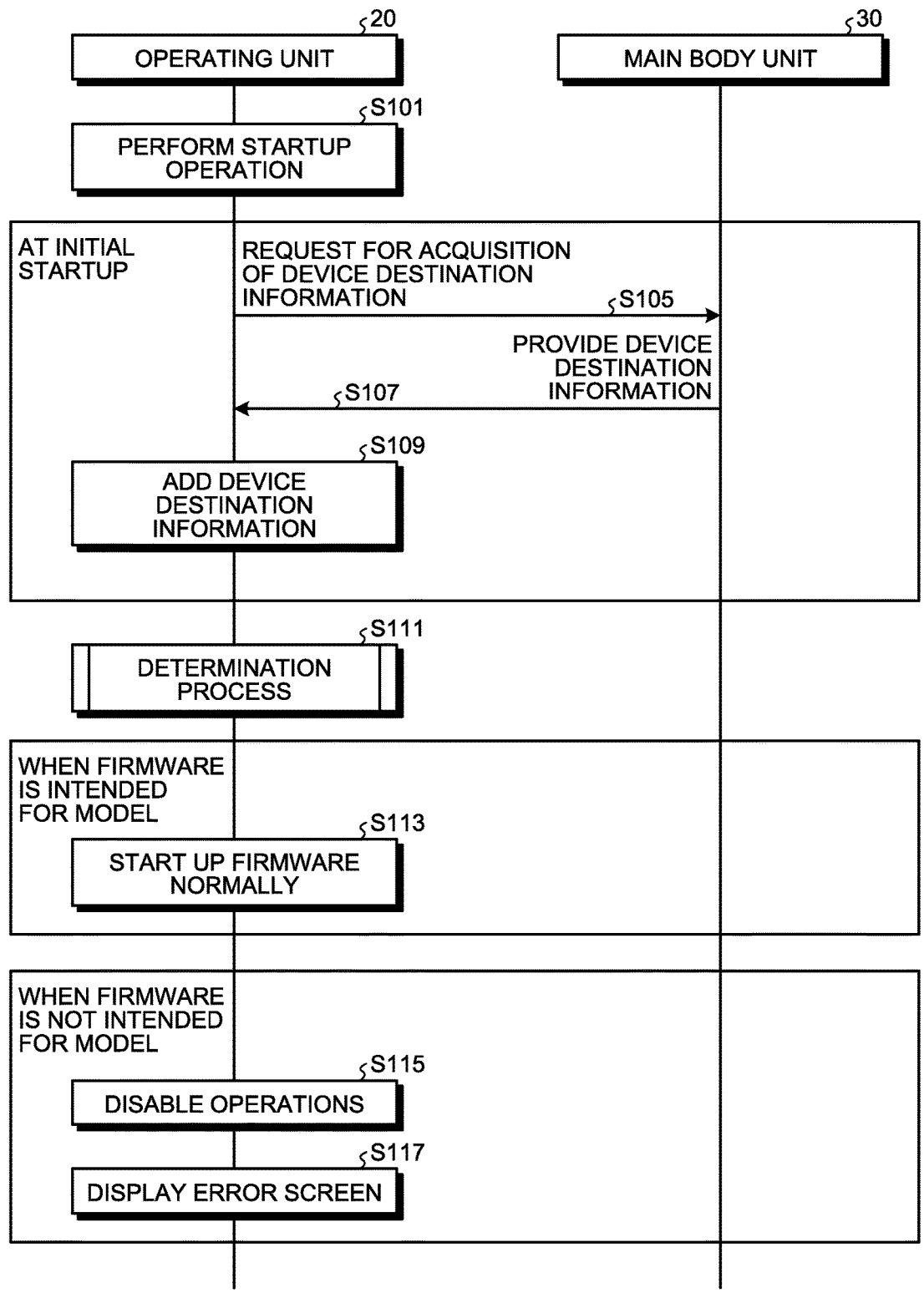
FIG. 8 is a sequence diagram illustrating an example of processing to be executed by the operating unit and the main body unit of the present embodiment.

FIG. 8 is a sequence diagram illustrating an example of processing to be executed by the operating unit 20 and the main body unit 30 of the present embodiment.

First, a startup operation that turns on power supply to the MFP 10 is performed (step S101).

Thereafter, when communication between the operating unit 20 and the main body unit 30 is first established at initial startup of the MFP 10, the acquirer 21 transmits a request command requesting for acquisition of the device destination information (the first model information) about the MFP 10 to the main body unit 30 (step S105).

Thereafter, upon receiving the request command requesting for acquisition of the device destination information about the MFP 10 from the operating unit 20, the provider 32 acquires the device destination information about the MFP 10 from the device-destination-information storage 31 and provides the device destination information to the operating unit 20 (step S107).

Thereafter, when the device destination information about the MFP 10 has been acquired by the acquirer 21, the model information manager 23 additionally registers (stores) the acquired device destination information about the MFP 10 in the device information storage 22 where the device category information about the MFP 10 and the device version information about the operating unit 20 are stored to manage the device destination information (step S109).

Thereafter, the determiner 27 performs a determination process that determines whether or not firmware installed on the MFP 10 is intended for the model of the MFP 10 using the device category information about the MFP 10, the device destination information about the MFP 10, and the device version information about the operating unit 20 managed by the model information manager 23 and the software destination information, the software category information, and the software version information managed by the software information manager 26 (step S111).

When the model information manager 23 is not managing the device category information about the MFP 10, the device destination information about the MFP 10, and the device version information about the operating unit 20, the emergency device category information, the emergency device destination information, and the emergency device version information stored in the emergency model-information storage 25 are used as the device category information about the MFP 10, the device destination information about the MFP 10, and the device version information about the operating unit 20, respectively.

The determination process will be described in detail later.

When it is determined through the determination process performed by the determiner 27 that the firmware installed on the MFP 10 is intended for the model of the MFP 10, the controller 28 starts the firmware with normal mode (step S113).

On the other hand, when it is determined through the determination process performed by the determiner 27 that the firmware installed on the MFP 10 is not intended for the model of the MFP 10, the controller 28 performs the control operation that disables operations performed on the operating unit 20 (step S115) and the control operation that causes such an error screen as that illustrated in FIG. 7 indicating that the firmware is not intended for the model of the MFP 10 to be displayed (step S117).

Figure 9:
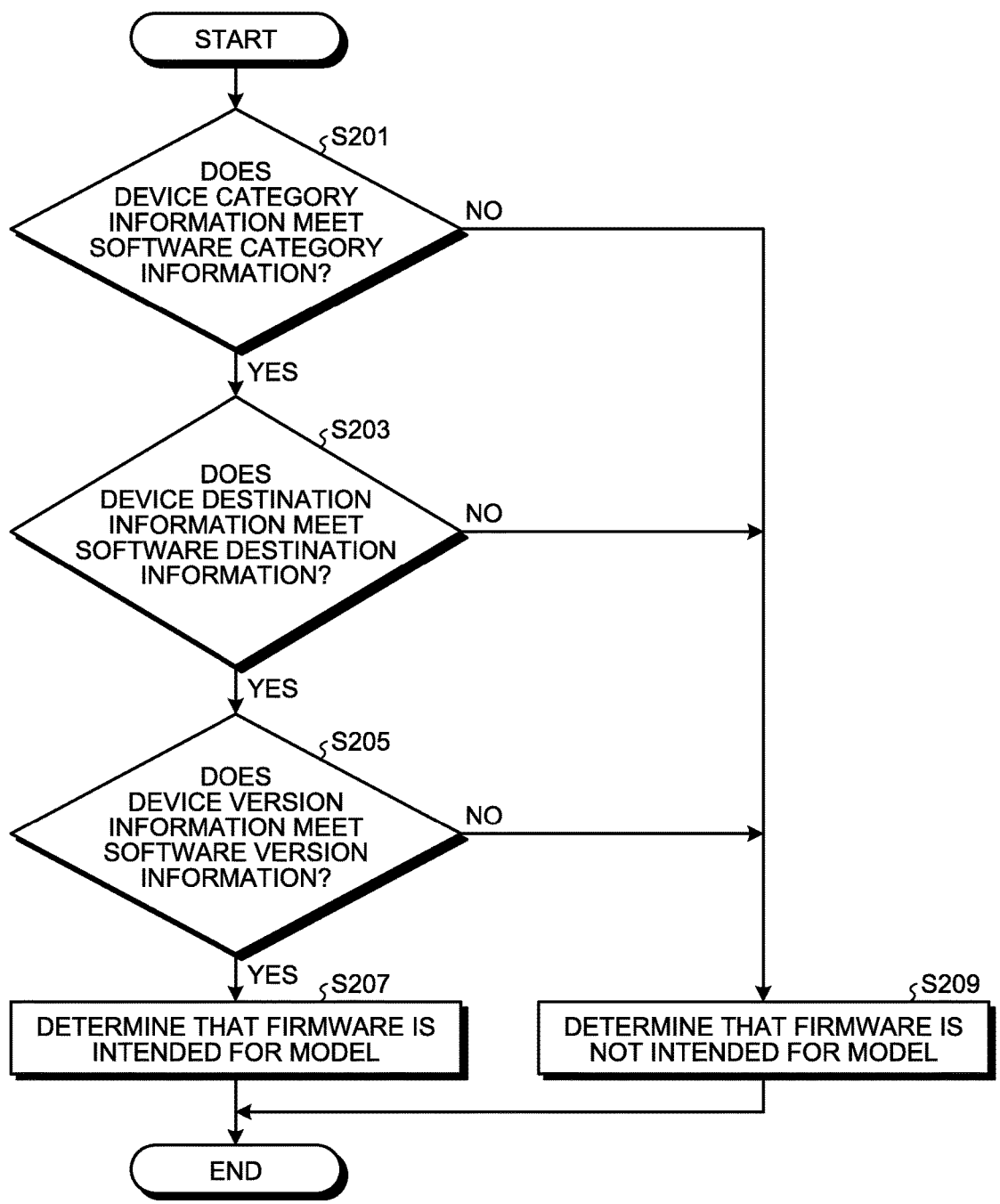
FIG. 9 is a flowchart illustrating a determination process of S111 of the flowchart illustrated in FIG. 8.

FIG. 9 is a flowchart illustrating the determination process of step S111 of the flowchart illustrated in FIG. 8.

First, the determiner 27 determines whether or not the device category information meets the software category information by determining whether or not the category indicated by the device category information is contained in the category(ies) indicated by the software category information (step S201).

When the device category information meets the software category information (Yes at step S201), the determiner 27 determines whether or not the device destination information meets the software destination information by determining whether or not the destination indicated by the device destination information is contained in the destination indicated by the software destination information (step S203).

When the device destination information meets the software destination information (Yes at step S203), the determiner 27 determines whether or not the device version information meets the software version information by determining whether or not the version indicated by the device version information is contained in the version(s) indicated by the software version information (step S205).

When the device version information meets the software version information (Yes at step S205), the determiner 27 determines that the firmware installed on the MFP 10 is intended for the model of the MFP 10 (step S207).

On the other hand, when the device category information does not meet the software category information (No at step S201), when the device destination information does not meet the software destination information (No at step S203), or when the device version information does not meet the software version information (No at step S205), the determiner 27 determines that the firmware installed on the MFP 10 is not intended for the model of the MFP 10 (step S209).

Figure 10:
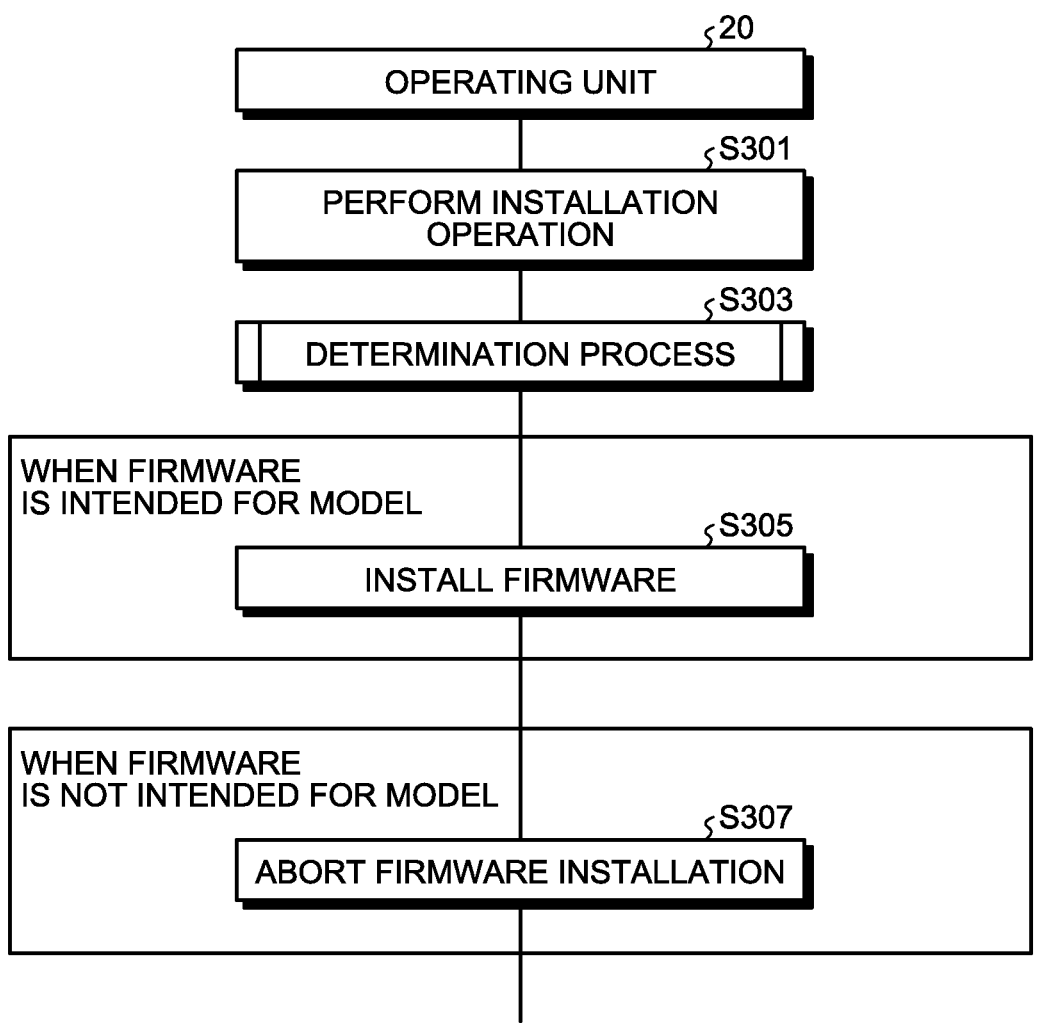
FIG. 10 is a sequence diagram illustrating an example of an installation process in a first mode performed by the operating unit of the present embodiment.

FIG. 10 is a sequence diagram illustrating an example of an installation process in the first mode performed by the operating unit 20 of the present embodiment.

First, in the normal mode, a customer engineer issues an instruction to install firmware to the installer 29 using a tool, such as a PC (Personal Computer). The installer 29 acquires installation information, which is information for installing the firmware on the MFP 10, in accordance with the installation instruction (S301). The installation information may be acquired from any source, which may be the PC used to issue the instruction. The installer 29 causes the software information manager 26 to manage software information contained in the installation information. Note that because the firmware is not installed yet at this stage, it is unnecessary that the software information manager 26 should store and manage the software information in the software information storage 24; the software information manager 26 may preferably manage the software information on the RAM 203.

Thereafter, the determiner 27 performs the determination process that determines whether or not the firmware being to be installed on the MFP 10 is intended for the model of the MFP 10 using the device category information about the MFP 10, the device destination information about the MFP 10, and the device version information about the operating unit 20 managed by the model information manager 23 and the software destination information, the software category information, and the software version information managed by the software information manager 26 (step S303).

Note that the software destination information, the software category information, and the software version information managed by the software information manager 26 is the software information (the software destination information, the software category information, and the software version information) managed on the RAM 203 rather than on the software information storage 24.

When the model information manager 23 is not managing the device category information about the MFP 10, the device destination information about the MFP 10, and the device version information about the operating unit 20, the emergency device category information, the emergency device destination information, and the emergency device version information stored in the emergency model-information storage 25 are used as the device category information about the MFP 10, the device destination information about the MFP 10, and the device version information about the operating unit 20, respectively.

Because the determination process is similar to that of the flowchart of FIG. 9, repeated detailed description is omitted.

When it is determined through the determination process performed by the determiner 27 that the firmware being to be installed on the MFP 10 is intended for the model of the MFP 10, the installer 29 installs the firmware on the MFP 10 using the acquired installation information (step S305).

On the other hand, when it is determined through the determination process performed by the determiner 27 that the firmware being to be installed on the MFP 10 is not intended for the model of the MFP 10, the installer 29 aborts installation of the firmware using the acquired installation information on the MFP 10 (S307).

As described above, in the present embodiment, at startup of software installed on the MFP 10, whether or not the software is intended for the model of the MFP 10 is determined and, when the software is not intended for the model of the MFP 10, utilization of a function(s) related to the software is inhibited.

Accordingly, according to the present embodiment, even when software that is not intended for the model of the MFP 10 (i.e., that is not intended for use on the model of the MFP 10) is unintentionally installed, an undesirable situation that the software is usable on the MFP 10 can be prevented. Hence, an undesirable situation that software that is not intended for the model of the MFP 10 is usable on the MFP 10 can be sufficiently prevented.

Assume that, for example, the MFP 10 where firmware whose destination is "China/Taiwan" is installed can display fonts and the like that require a license. If this firmware is unintentionally installed on the MFP 10 whose destination is "common", the MFP 10 will become capable of displaying the fonts and the like that require the license, which is undesirable. However, the present embodiment can prevent occurrence of the undesirable situation.

Furthermore, in the present embodiment, the operating unit 20 acquires the first model information (the device destination information about the MFP 10), based on which whether or not installed software is intended for the model of the MFP 10 is determined, from the main body unit 30. Accordingly, the operating unit 20 can determine whether or not the installed software is intended for the model of the MFP 10 even when the operating unit 20 does not own the first model information.

In particular, in the present embodiment, because the operating unit 20 manages the first model information (the device destination information about the MFP 10) in the manner that maintains integrity of the first model information, the operating unit 20 can determine whether or not the installed software is intended for the model of the MFP 10 reliably.

Computer-Readable Storage Medium

Programs to be executed by the operating unit 20 of the embodiment may be provided in a form stored in a non-transitory computer-readable storage medium, such as a CD-ROM, a CD-R, a memory card, a DVD (Digital Versatile Disk), and a flexible disk (FD), as an installable file or an executable file.

The programs to be executed by the operating unit 20 of the embodiment may be configured to be stored in a computer connected to a network, such as the Internet, and provided by being downloaded over the network. The programs to be executed by the operating unit 20 of the embodiment may be configured to be provided or delivered over a network, such as the Internet. The programs to be executed by the operating unit 20 of the embodiment may be configured to be provided in a form installed on a ROM or the like in advance.

The programs to be executed by the operating unit 20 of the embodiment have a module structure for implementing the functional units described above on a computer. From an actual hardware perspective, the functional units described above are implemented on the computer by, for example, the CPU 201 by loading the programs from the ROM 202 into the RAM 203 and executing the programs.

The embodiment described above can be altered or modified in various manners within the scope of the present invention. Variations of the embodiment may be made without departing from the scope of the present invention as set forth in the appended claims.

Aspects of the present invention can be implemented by programming a conventional computer so as to implement the aspects of the present invention as set forth in the appended claims by using an information processing technology related to computer architectures and computing processing. Engineers having general knowledge in the software technology field can write software that causes a computer to execute programs that cause the computer to implement the aspects of the present invention based on the description herein.

Engineers having general knowledge in the information processing technology field can embody the aspects of the present invention as an apparatus configured by connecting an ASIC(s) (Application Specific Integrated Circuit(s)) and a conventional circuit module(s).

Each of the functions described in the embodiment can be implemented by one or a plurality of processing circuits. Noted that the "processing circuit" in the specification herein includes a processor programmed so as to execute the function(s) by software and hardware including the ASIC(s) and the circuit module(s) designed so as to execute the function(s).

According to an aspect of the present invention, a device is sufficiently capable of, even when the device includes a main body unit and an operating unit that controls operations of the main body unit, preventing software that is not intended for use on the device from undesirably becoming usable on the device.

According to the present invention, an effect of being able to accurately detect a traffic light region and a traffic light color of a traffic light from a captured image is achieved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device comprising:
  a main body unit; and
  an operating unit configured to control operations of the main body unit, the operating unit comprising a memory including computer-readable instructions stored therein, and a processor configured to execute the computer-readable instructions to:
    acquire first model information about a model of the device from the main body unit, the first model information including device destination information indicating a destination of the model of the device,
    manage second model information about the model of the device stored in advance, the second model information including device category information indicating a category to which the model of the device belongs and device version information indicating a version of the operating unit,
    manage software information indicating a model for which software installed on the device is intended, the software information including software destination information indicating a destination of the software, software category information indicating one or more model categories for which the software is intended, and software version information indicating one or more versions of the operating unit for which the software is intended,
    determine, prior to startup of the software, whether the software is intended for the model of the device based on comparing at least one of the first model information and the second model information with the software information, wherein the processor determines that the software is not intended for the model of the device in response to obtaining at least one of
      a first result indicating that the destination of the model of the device does not match the destination of the software,
      a second result indicating that the category to which the model of the device belongs is not included in the one or more model categories for which the software is intended, or
      a third result indicating that the version of the operating unit is not included in the one or more versions of the operating unit for which the software is intended, and
    perform a control operation that inhibits utilization of one or more hardware resources of the device for performing a function related to the software in response to determining that the software is not intended for the model of the device.

2. The device according to claim 1, wherein
  the operating unit and the main body unit are communicably connected to each other, and
  the processor is further configured to execute the computer-readable instructions to:
    acquire the first model information about the model of the device from the main body unit upon communication between the operating unit and the main body unit being established, and
    upon the first model information being acquired, store the first model information together with the second model information stored in advance and manage the first model information and the second model information in a manner that maintains integrity thereof.

3. The device according to claim 2, wherein the processor is configured to execute the computer-readable instructions to manage the first model information and the second model information on a model information storage, access to which is permitted only to the processor of the operation unit, without altering the first model information and the second model information.

4. The device according to claim 1, wherein
  the software is firmware, and
  in response to determining that the firmware is not intended for the model of the device, the processor is further configured to execute the computer-readable instructions to:
    perform a control operation that causes a screen indicating that the firmware is not intended for the model of the device to be displayed, and
    perform a control operation that disables operations performed on the operating unit.

5. The device according to claim 1, wherein the processor of the operating unit is further configured to execute the computer-readable instructions to install the software on the device wherein:
  when the software is to be installed in a first mode, the processor installs the software based on a condition that the processor determines that the software is intended for the model of the device, and
  when the software is to be installed in a second mode, the processor installs the software unconditionally, without determining whether the software is intended for the model of the device prior to installation of the software.

6. The device according to claim 1, wherein
  the processor is further configured to execute the computer-readable instructions to manage emergency model information that is provided in conjunction with installation of the software, and
  when the processor is not managing the first model information and the second model information, the processor is configured to determine whether the software is intended for the model of the device based on the emergency model information and the software information.

7. The device according to claim 1, wherein
  the device category information indicating the category to which the model of the device belongs indicates one of an office model, a wide-format model, or a production printing model, and
  the software category information indicating the one or more model categories for which the software is intended indicates at least one of the office model, the wide-format model, and the production printing model.

8. A control method to be performed by an operating unit of a device including a main body unit and the operating unit configured to control operations of the main body unit, the control method comprising:
  acquiring first model information about a model of the device from the main body unit, the first model information including device destination information indicating a destination of the model of the device;
  managing second model information about the model of the device stored in advance, the second model information including device category information indicating a category to which the model of the device belongs and device version information indicating a version of the operating unit;

managing software information indicating a model for which software installed on the device is intended, the software information including software destination information indicating a destination of the software, software category information indicating one or more model categories for which the software is intended, and software version information indicating one or more versions of the operating unit for which the software is intended;

determining, prior to startup of the software, whether the software is intended for the model of the device based on comparing at least one of the first model information and the second model information with the software information, wherein the determining includes determining that the software is not intended for the model of the device in response to obtaining at least one of a first result indicating that the destination of the model of the device does not match the destination of the software, a second result indicating that the category to which the model of the device belongs is not included in the one or more model categories for which the software is intended, or a third result indicating that the version of the operating unit is not included in the one or more versions of the operating unit for which the software is intended; and performing a control operation that inhibits utilization of one or more hardware resources of the device for performing a function related to the software in response to determining that the software is not intended for the model of the device.

9. The control method according to claim 8, wherein the operating unit and the main body unit are communicably connected to each other, and the control method further comprises:

acquiring the first model information about the model of the device from the main body unit upon communication between the operating unit and the main body unit being established, and upon the first model information being acquired, storing the first model information together with the second model information on a model information storage, access to which is permitted only to the operating unit, and managing the first model information and the second model information in a manner that maintains integrity thereof without altering the first model information and the second model information.

10. The control method according to claim 8, wherein the software is firmware, and in response to determining that the firmware is not intended for the model of the device, the control method further comprises:

performing a control operation that causes a screen indicating that the firmware is not intended for the model of the device to be displayed, and performing a control operation that disables operations performed on the operating unit.

11. The control method according to claim 8, further comprising installing the software on the device wherein:

when the software is to be installed in a first mode, the software is installed based on a condition that the processor determines that the software is intended for the model of the device, and when the software is to be installed in a second mode, the software is installed unconditionally, without determining whether the software is intended for the model of the device prior to installation of the software.

12. The control method according to claim 8, wherein the control method further comprises managing emergency model information that is provided in conjunction with installation of the software, and when the first model information is not being managed, the control method comprises determining whether the software is intended for the model of the device based on the emergency model information and the software information.

13. The control method according to claim 8, wherein the device category information indicating the category to which the model of the device belongs indicates one of an office model, a wide-format model, or a production printing model, and the software category information indicating the one or more model categories for which the software is intended indicates at least one of the office model, the wide-format model, and the production printing model.

14. A device comprising:

a main body unit; and an operating unit configured to control operations of the main body unit, wherein the operating unit includes circuitry configured to:

acquire first model information about a model of the device from the main body unit, the first model information including device destination information indicating a destination of the model of the device;

manage second model information about the model of the device stored in advance, the second model information including device category information indicating a category to which the model of the device belongs and device version information indicating a version of the operating unit, manage software information indicating a model for which software installed on the device is intended, the software information including software destination information indicating a destination of the software, software category information indicating one or more model categories for which the software is intended, and software version information indicating one or more versions of the operating unit for which the software is intended;

determine, prior to startup of the software, whether the software is intended for the model of the device based on comparing at least one of the first model information and the second model information with the software information, wherein the circuitry determines that the software is not intended for the model of the device in response to obtaining at least one of a first result indicating that the destination of the model of the device does not match the destination of the software, a second result indicating that the category to which the model of the device belongs is not included in the one or more model categories for which the software is intended, or a third result indicating that the version of the operating unit is not included in the one or more versions of the operating unit for which the software is intended; and perform a control operation that inhibits utilization of one or more hardware resources of the device for performing a function related to the software in response to determining that the software is not intended for the model of the device.

15. The device according to claim 14, wherein
the operating unit and the main body unit are communicably connected to each other, and
the circuitry is further configured to:
   acquire the first model information about the model of the device from the main body unit upon communication between the operating unit and the main body unit being established, and
   upon the first model information being acquired, store the first model information together with the second model information on a model information storage, access to which is permitted only to the circuitry of the operating unit, and manage the first model information and the second model information in a manner that maintains integrity thereof without altering the first model information and the second model information.

16. The device according to claim 14, wherein
the software is firmware, and
in response to determining that the firmware is not intended for the model of the device, the circuitry is further configured to:
   perform a control operation that causes a screen indicating that the firmware is not intended for the model of the device to be displayed, and
   perform a control operation that disables operations performed on the operating unit.

17. The device according to claim 14, wherein the circuitry of the operating unit is further configured to install the software on the device wherein:
   when the software is to be installed in a first mode, the circuitry installs the software based on a condition that the processor determines that the software is intended for the model of the device; and
   when the software is to be installed in a second mode, the circuitry installs the software unconditionally, without determining whether the software is intended for the model of the device prior to installation of the software.

18. The device according to claim 14, wherein
the circuitry is further configured to manage emergency model information that is provided in conjunction with installation of the software, and
when the circuitry is not managing the first model information, the circuitry is configured to determine whether the software is intended for the model of the device based on the emergency model information and the software information.

19. The device according to claim 14, wherein
the device category information indicating the category to which the model of the device belongs indicates one of an office model, a wide-format model, or a production printing model, and
the software category information indicating the one or more model categories for which the software is intended indicates at least one of the office model, the wide-format model, and the production printing model.

* * * * *